United States Patent
Pong et al.

(10) Patent No.: US 6,490,662 B1
(45) Date of Patent: Dec. 3, 2002

(54) SYSTEM AND METHOD FOR ENHANCING THE RELIABILITY OF A COMPUTER SYSTEM BY COMBINING A CACHE SYNC-FLUSH ENGINE WITH A REPLICATED MEMORY MODULE

(75) Inventors: Fong Pong, Mountain View, CA (US); Tung Nguyen, Cupertino, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/561,755

(22) Filed: Apr. 29, 2000

(51) Int. Cl.[7] .............................. G06F 12/00
(52) U.S. Cl. .................. 711/152; 711/128; 711/145; 711/163
(58) Field of Search ................. 711/128, 152, 711/14, 145, 163; 709/229, 253; 707/8; 710/108

(56) References Cited

U.S. PATENT DOCUMENTS

| | | | | |
|---|---|---|---|---|
| 4,937,733 A | * | 6/1990 | Gillett, Jr. et al. | 710/108 |
| 4,977,498 A | * | 12/1990 | Rastegar et al. | 711/128 |
| 4,979,097 A | * | 12/1990 | Triolo et al. | 709/253 |
| 5,175,852 A | * | 12/1992 | Johnson et al. | 707/8 |
| 5,276,852 A | * | 1/1994 | Callander et al. | 711/143 |
| 5,341,510 A | * | 8/1994 | Gillett, Jr. et al. | 709/229 |
| 5,404,482 A | * | 4/1995 | Stamm et al. | 711/145 |
| 6,032,216 A | * | 2/2000 | Schmuck et al. | 710/200 |

* cited by examiner

Primary Examiner—David Hudspeth
Assistant Examiner—Fred F. Tzeng

(57) ABSTRACT

A computer system and method for enhancing the reliability of a computer system by combining a cache sync-flush engine with a replicated memory module includes placing a "lock" command on the common bus. The lock protects or controls accesses to a number of memory locations in the memory modules designated by the programmer. At any point in time, one processor can obtain the lock, and hence has access to the number of memory locations protected by the lock. Other processors may attempt to acquire or make a request for the same lock, however, the other processor will fail until the processor that has the lock has released (i.e., "unlocked") the lock. The other processors will keep trying to get the lock. The processor that obtains the lock instructs the system control unit to begin logging or monitoring all subsequent memory addresses that appear on the common bus. After the processor gets the lock, it can start reading from and writing to the number of memory locations that are implemented as a number of replicated memory modules. A data value is then determined based on the data held by a majority of the replicated memory modules. The data value is transmitted to the cache of the processor. After the data is processed, an "unlock" command is transmitted from the processor to a system control unit that issues a write back request on the common bus that flushes the data value from the cache to the number of replicated memory modules.

17 Claims, 2 Drawing Sheets

SYSTEM AND METHOD FOR ENHANCING THE RELIABILITY OF A COMPUTER SYSTEM BY COMBINING A CACHE SYNC-FLUSH ENGINE WITH A REPLICATED MEMORY MODULE

BACKGROUND OF THE INVENTION

1. Field of Invention

The present invention relates to the field of computer systems. More particularly, this invention relates to a system and method for enhancing the reliability of a computer system by combining a cache sync-flush engine with a replicated memory module. The cache sync-flush engine is the logic that facilitates the flushing operation from a cache to a memory complex.

2. Description of Related Art

A computer system typically includes a memory and a processor. The memory generally includes a main memory and a cache memory for storing data and instructions for the processor. The cache memories store blocks of data and/or instructions that are received from the main memory. Typically, instructions from the main memory that are used by the processor are stored in the instruction cache and the data for that particular instruction is stored in the data cache.

To execute a specific instruction in an application, the processor may issue read and write operations to the memory. During a read operation, the processor first checks its local cache for the address corresponding to the read operation. If the address is found, the processor retrieves the data from its local cache. If the address is not found, the processor searches for the data in the main memory. Once the data has been located, the processor makes a copy of the data from main memory and stores the copied data in its local cache. Since a read operation does not change the content of the data, the copied data in the cache is identical to the data in the main memory. The copying of data from the main memory results in several read-only copies of the same data existing in multiple caches. The cached copies of data are sometimes referred to as clean copies.

During a write operation, the processor first checks its local cache for the address corresponding to the write operation. If the address is found, the processor replaces the data in its local cache. If the address is not found, the processor searches for the data in the main memory. Once the data has been located, the processor retrieves the data from main memory, stores the data in its local cache, and invalidates all other cached copies of the data. The processor that retrieved the data is the owner of the data and has an exclusive and most recent copy of the data. This data may be modified when it is in the processor's local cache. The main memory now holds an obsolete value of the data.

A problem arises when the processor that owns the data or the cache or main memory that hold the data fails. These failures cause loss of the most recent value of the data and may significantly impact individuals and businesses. Furthermore, businesses can suffer significant monetary losses when processors and memories fail.

In order to avoid these failures, redundant systems have been developed. These systems are designed to have multiple redundancies to prevent or minimize the loss of information should the processor or memory fail. These redundant systems are also referred to as fault tolerance systems. One type of redundant system duplicates the entire hardware system. That is, all the hardware components are mirrored such that the duplicate components perform the same functions as the main system but are transparent to the main system. Duplicating the hardware components is a practice that is used by many designers to further enhance the reliability of computer systems. For example, if the main computer system fails, the redundant computer system having the same hardware components continues to process the data, thus eliminating the loss of data and the disruption in processing the data. The redundant computer systems run directly in parallel and in sync with the main computer system. Hence, there are multiple processors and multiple memories executing the same instructions at the same time. These systems provide additional reliability which minimize the number of computer system failures. The duplication of all of the hardware components, however, significantly increases the costs associated with manufacturing the computer system.

It should therefore be appreciated that there remains a need for a computer system that can have the same or better reliability as prior systems without the cost of replicating entire hardware systems. The present invention fulfills this need.

SUMMARY OF THE INVENTION

The present invention is embodied in a computer system, and related method, for enhancing the reliability of a computer system by combining a cache sync-flush engine with a replicated memory module. Architecturally, the computer system includes a number of nodes coupled to a shared memory via an interconnect network. Each node has a number of processors and caches which are connected to a system control unit via a common bus. The shared memory has a number of replicated memory modules for storing identical copies of data.

The related method includes placing or issuing a "lock" command on the common bus. The lock protects or controls accesses to a number of memory locations in the memory modules designated by the programmer. At any point in time, one processor can obtain the lock, and hence has access to the number of memory locations protected by the lock. Other processors may attempt to acquire or make a request for the same lock, however, the other processor will fail until the processor that has the lock has released (i.e., "unlocked") the lock. The other processors will keep trying to get the lock. The processor that obtains the lock instructs the system control unit to begin logging or monitoring all subsequent memory addresses that appear on the common bus. After the processor gets the lock, it can start reading from and writing to the number of memory locations that implemented as a number of replicated memory modules. A data value is then determined based on the data held by a majority of the replicated memory modules. The data value is transmitted to the cache of the processor. After the data is processed, an "unlock" command is transmitted from the processor to a system control unit that issues a write back request on the common bus that flushes the data value from the cache to the number of replicated memory modules.

Other features and advantages of the present invention will be apparent from the detailed description that follows.

DESCRIPTION OF THE PREFERRED EMBODIMENT

Figure 1:
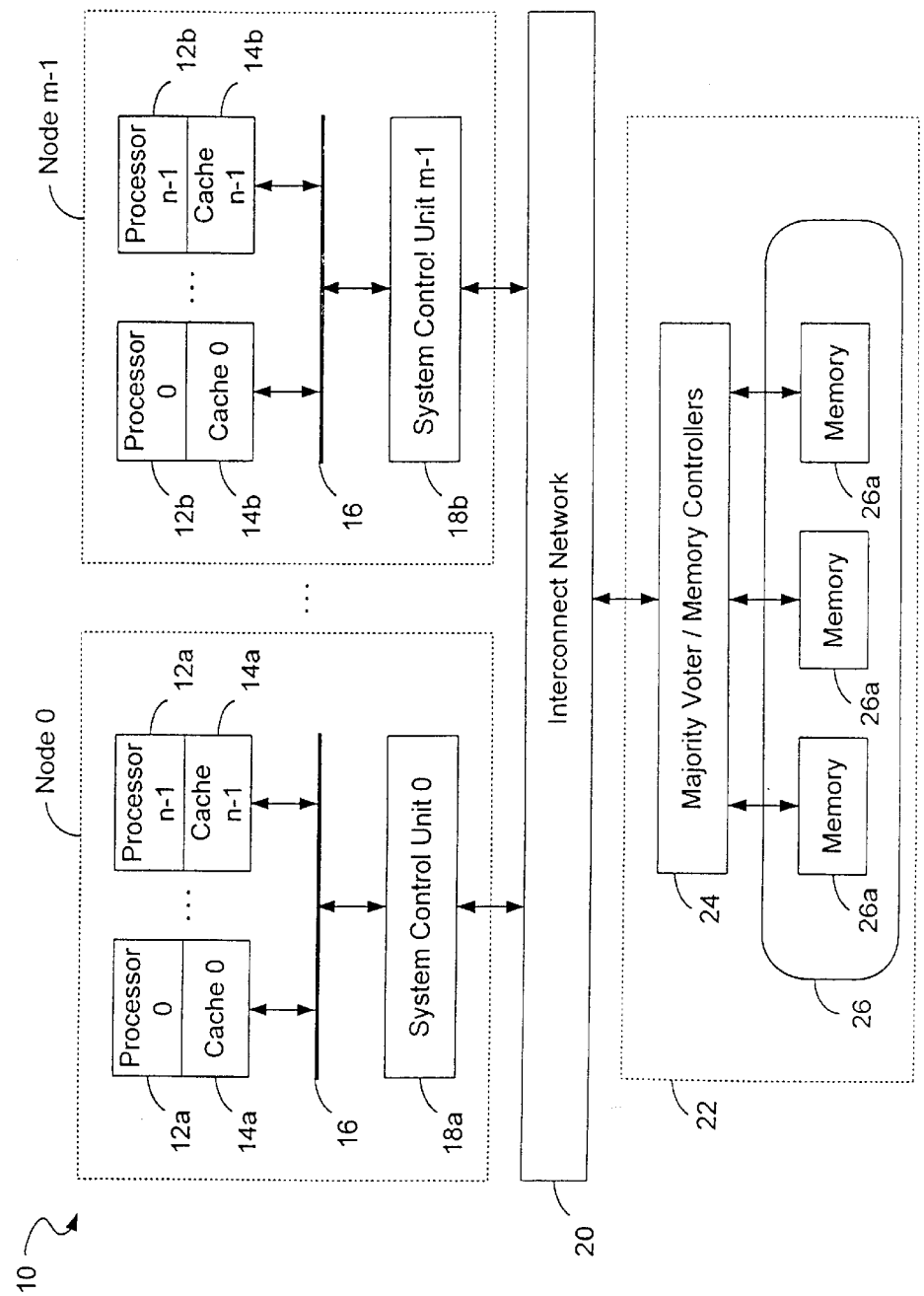
FIG. 1 is a block diagram of a computer system that processes multiple memory accesses in parallel using system control units.

With reference now to the illustrative drawings, and particularly to FIG. 1, there is shown a block diagram of a computer system 10 that utilizes a cache-coherent shared-memory architecture combined with a memory complex 22 to enhance the reliability of the data stored in memory. The computer system 10, as shown in FIG. 1, has m nodes where each node has up to n processors 12 and n caches 14, a common bus 16, and m system control units 18 connected to an interconnect network 20. The m nodes communicate with each other and the shared memory complex via the interconnect network 20. Each node may have a different number of processors and caches. Each processor is connected to a cache and supports multiple coherent memory transactions. The caches are connected to the system control unit either via the common bus 16 or independent point-to-point interfaces. The system control unit is a type of memory controller that includes a buffer or queue that is used to store data before it is transferred to a processor, another system control unit, or the memory complex. Alternatively, the buffer may be part of the memory complex. Each system control unit utilizes a number of finite state machines (FSMs) that keep track of and update the state and data of each transaction it receives from the processors.

The interconnect network 20 is used for communication between the m nodes and the memory complex 22. The interconnect network may include a number of switches and routers that are used to route the data between the processors 12, the caches 14, the system control units 18, and the memory complex 22. The memory complex includes a majority voter/memory controllers 24 and a shared memory 26 having a number of replicated memory modules 26a. All, e.g., three, of the replicated memory modules 26a contain identical data or information. Even though three identical memory modules are shown, one of ordinary skill in the art may implement the shared memory 26 using less than or greater than three replicated memory modules. Typically, an odd number of memory modules is implemented.

An application program running on processor 12 sends instructions to the processor which issues commands to the system control unit 18 based on those instructions. The commands issued by the processor typically access data located in the memory modules. To begin processing the commands, the processor 12a makes a request, e.g., checks a lock bit, for a "lock" command on the common bus 16. A lock bit is assigned to a particular address or group of addresses to identify whether the data contained in that address or group of addresses is currently being accessed. The lock bit protects the address or group of addresses in memory from being accessed by more than one processor. If the lock bit corresponding to a particular lock command is 0, then the data is available to be accessed by a processor. Otherwise, if the lock bit corresponding to a particular lock command is 1, then the data is currently being accessed by a processor.

If the lock bit is 1, the processor continues to issue lock requests until it has received a "lock". If the lock variable is 0, the memory controller 24 sets the lock variable to ensure that only one processor is accessing the data corresponding to the addresses of the "lock" command at a particular time. The system control unit activates its "cache-sync-flush" mode.

The lock command controls access to a number of memory locations in the memory modules. Once the processor obtains the "lock" command, the system control unit 18 instructs its cache-sync-flush engine ("CFE") to begin "logging" or monitoring subsequent memory accesses that appear on the common bus 16.

After the processor gets the lock, the processor issues commands, e.g., reading from and writing to particular memory locations protected by the lock, to the number of replicated memory modules 26 via the interconnect network 20 and the memory controller 24. The memory controller 24 accesses the data from the particular memory locations in one replicated memory module 26a and sends the data to the system control unit 18. Alternatively, the memory controller retrieves the same data from the addresses located in all three replicated memory modules. The majority voter 24 compares all the data received and selects the value of the data held by the majority of the memory modules. Comparing and selecting the data having the majority occurrence further enhances the reliability of the computer system 10. The feature allows the computer system 10 to provide accurate data even if one memory cell or the entire memory array of one of the replicated memory modules 26a fails.

After the data is retrieved from the memory and forwarded to the system control unit 18, the data is sent to the cache of the processor that obtained the "lock" command. If the processor has not failed, the processor will continue its operations, e.g., update or process the data, and at the end of processing will issue an "unlock" command to the CFE. Upon receipt of the "unlock" command, the CFE issues a write back request on the common bus 16 so that the cache lines containing the data are flushed out of the cache 14 and forwarded to the CFE. The CFE sends the updated data to the memory controller 24 via the interconnect network 20. The memory controller stores the updated data in all three replicated memory modules 26a to further enhance the reliability of the data. Storing the data in the shared memory 26 ensures that the updated data is not lost due to the failure of caches.

The processor sends the "unlock" command to the memory controller 24 to release, e.g., set to 0, the lock bit corresponding to the "lock" command. No other processor or system control unit can access the same data until the processor that locked the command, unlocks the command. Until an unlock command is received by the system control unit, other processors must wait until they obtain a "lock" command.

The above description describes one system control unit in sync-flush mode. One of ordinary skill in the art will be able to build a computer system where multiple system control units are in sync-flush mode at any given time using this disclosure.

Figure 2:
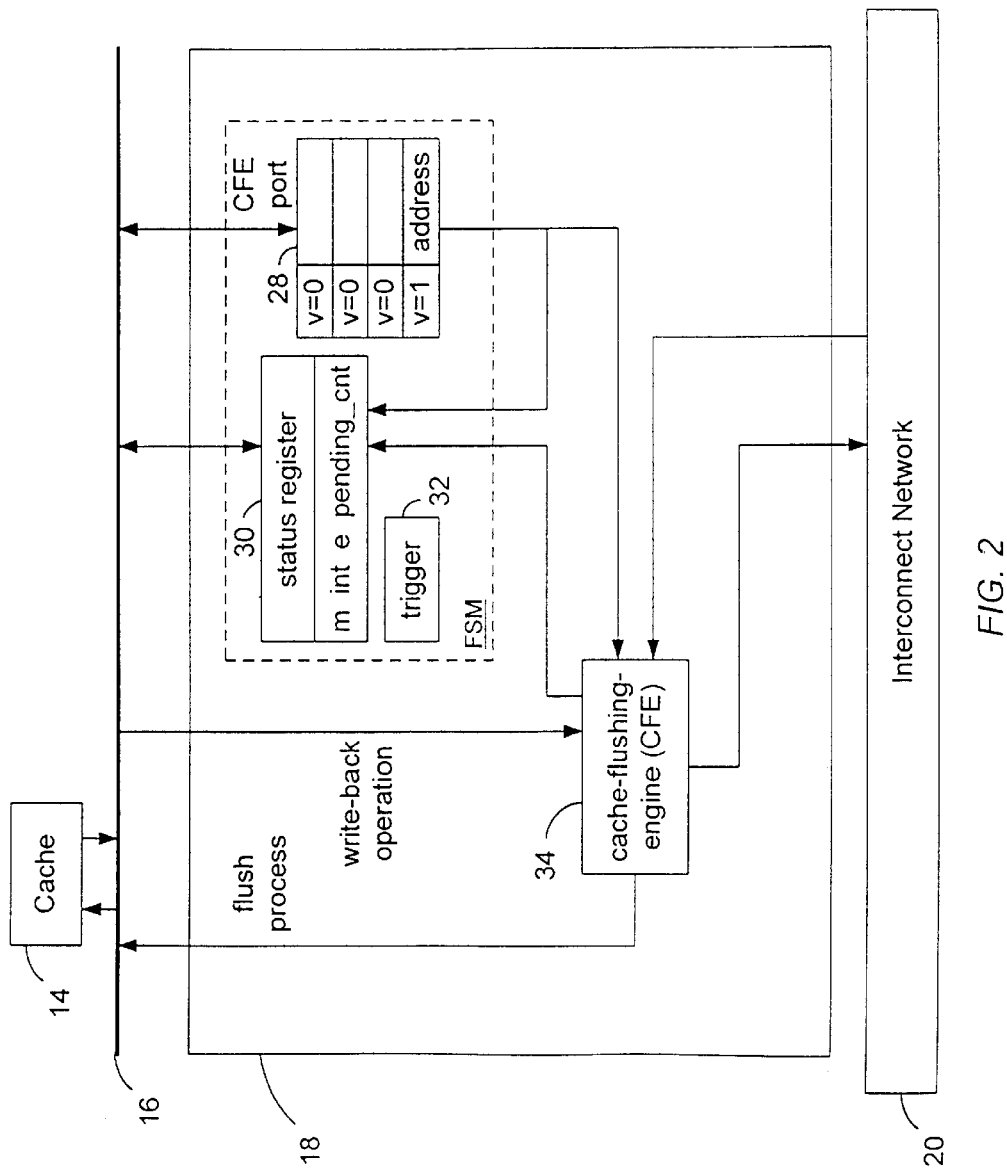
FIG. 2 is a block diagram of the system control unit of FIG. 1.

FIG. 2 is a block diagram of the system control unit 18 of FIG. 1. The system control unit includes a buffer 28 that stores the address received from the common bus 16. The buffer also has a validity bit v that indicates whether the address stored with the bit is valid. A v=0 indicates that the address is not valid and a v=1 indicates that the address is valid. The size of the buffer depends on the application and can be statically or dynamically allocated. Furthermore, the buffer can be part of the shared memory 26 and thus external to the system control unit.

Before the processor 12 issues a "lock" command on the common bus 16, the processor reads a cache-flushing-engine (CFE) port to determine whether the system control unit 18 is available to process a "lock" command. If a status register 30 returns a "1" to the processor, the CFE is ready to process the commands issued by the processor. If the status register returns a "0" to the processor, the CFE is busy and is serving another processor.

The CFE 34 uses the buffer 28 to store all subsequent memory addresses after the lock command that appear on the common bus 16. The buffer stores the addresses in a queue and sets the corresponding validity bit which indicates that this address stored in the queue is valid. The status register 30 tracks the state of the queue and the commands and addresses received from the processors 12.

Once the processor 12 executes its operations, the processor sends a trigger command to the CFE to flush the cache. The CFE uses the addresses stored in its queue to issue a write back command on the common bus to force the cache to write back the data to the memory complex.

The foregoing detailed description of the present invention is provided for the purposes of illustration and is not intended to be exhaustive or to limit the invention to the precise embodiment disclosed. Accordingly, the scope of the present invention is defined by the following claims.

What is claimed is:

1. In a computer system comprising a node coupled to a shared memory via an interconnect network, the shared memory having a plurality of replicated memory modules, the node having first and second processors and caches, the caches connected to a system control unit via a common bus, a method of ensuring that only one processor has access to a particular memory address in a shared memory at a given time, the method comprising:

issuing a lock command on the common bus;

requesting the lock command using the first processor;

retrieving data from the particular memory address located in a plurality of replicated memory modules;

determining a data value corresponding to the data that is held by a majority of the plurality of replicated memory modules;

transmitting the data value to the cache of the first processor; and sending an unlock command from the first processor to the system control unit.

2. In a computer system comprising a memory module and a plurality of connected processor and cache configured to issue lock and unlock requests, the method of reading and writing back memory module data, comprising:

receiving a lock request for a given region of the memory module from a given connected processor and cache;

locking the given region to control access to data stored at addresses from within the given region;

reading and transmitting data from one or more addresses within the given region to the given connected processor and cache;

storing the one or more addresses from within the given region in a buffer;

receiving an unlock request for the given region;

unlocking the given region; and writing back data from the given connected processor and cache to each address that is stored in the buffer and within the given region.

3. The method of claim 2, wherein the computer system further comprises a plurality of nodes, each node of the plurality of nodes including a separate set of one or more of the plurality of connected processor and cache, and wherein the given connected processor and cache are included in a first node of the plurality of nodes, and further comprising:

receiving a lock request for a second given region of the memory module from a second given connected processor and cache in a second node;

locking the second given region to control access to data stored at addresses from within the second given region;

reading and transmitting data from one or more addresses within the second given region to the second given connected processor and cache;

storing the one or more addresses from within the second given region in a buffer;

receiving an unlock request for the second given region;

unlocking the second given region; and writing back data from the second given connected processor and cache to each address that is stored in the buffer and within the second given region;

wherein steps relating to the reading and writing back of data in the first given region occur in parallel with steps relating to the reading and writing back of data in the second given region.

4. The method of claim 3, the computer system further comprising one or more additional memory modules to form a plurality of memory modules, each memory module being configured with a copy of the data in the other memory modules, wherein:

the step of reading and transmitting data from the first given region includes reading data from each of the plurality of memory modules, comparing the read data to determine data values held by a majority of the plurality of memory modules, and transmitting the data values held by a majority of the plurality of memory modules;

the step of writing back data from the first given connected processor and cache comprises writing back the data to each memory module of the plurality of memory modules;

the step of reading and transmitting data from the second given region includes reading data from each of the plurality of memory modules, comparing the read data to determine data values held by a majority of the plurality of memory modules, and transmitting the data values held by a majority of the plurality of memory modules; and the step of writing back data from the second given connected processor and cache comprises writing back the data to each memory module of the plurality of memory modules.

5. The method of claim 3, wherein:

the set of one or more of the plurality of connected processor and cache for the first node includes at least two connected processor and cache;

the set of one or more of the plurality of connected processor and cache for the second node includes at least two. connected processor and cache;

the step of receiving a lock request for a given region of the memory module includes monitoring a first common bus connected to each connected processor and cache of the first node; and the step of receiving a lock request for a second given region of the memory module includes monitoring a second common bus connected to each connected processor and cache of the second node.

6. The method of claim 5, and further comprising:

maintaining a readable port accessible through the first common bus and configured to provide information on the availability for receiving a lock request from any connected processor and cache of the first node; and maintaining a readable port accessible through the second common bus and configured to provide information on the availability for receiving a lock request from any connected processor and cache of the second node.

7. The method of claim 2, the computer system further comprising one or more additional memory modules to form a plurality of memory modules, each memory module being configured with a copy of the data in the other memory modules, wherein:

the step of reading and transmitting data includes reading data from each of the plurality of memory modules, comparing the read data to determine data values held by a majority of the plurality of memory modules, and transmitting the data values held by a majority of the plurality of memory modules; and the step of writing back data comprises writing back the data from the given connected processor and cache to each memory module of the plurality of memory modules.

8. The method of claim 2, wherein the step of storing the one or more addresses comprises writing the one or more addresses to a region in the memory module.

9. The method of claim 2, wherein at least some data written in the step of writing back data is changed from when it was transmitted in the step of reading and transmitting data.

10. The method of claim 2, wherein at least some data written in the step of writing back data is unchanged from when it was transmitted in the step of reading and transmitting data.

11. The method of claim 2, wherein the step of locking the given region includes setting a lock bit associated with the given region to a lock setting, and wherein the step of unlocking the given region includes setting the lock bit to an unlocked setting.

12. A computer system, comprising:

a memory module;

a memory controller;

a plurality of connected processors and caches, each connected processor and cache being configured to issue lock and unlock requests for regions of the memory module; and a system control unit connected to a given connected processor and cache of the plurality of connected processors and caches;

wherein the memory controller is configured to lock and unlock access to individual regions of the memory module in response to lock and unlock requests from connected processors and caches;

wherein the system control unit is configured to store memory-module addresses of data copied from a locked memory region to the given connected processor and cache; and wherein the system control unit is configured to write back cache data to the locked memory region in response to an unlock request for the locked memory region issued by the given connected processor and cache.

13. The computer system of claim 12, and further comprising one or more additional memory modules to form a plurality of memory modules, each memory module of the plurality of memory modules being configured to store a copy of the data in the other memory modules, wherein the memory controller includes a voter configured to compare copies of data received from the plurality of memory modules and select data having the greatest occurrence from among the copies of data.

14. The computer system of claim 13, wherein copies of data transmitted from the connected processor and cache are written to each of the plurality of memory modules.

15. The computer system of claim 12, and further comprising one or more system control units to form a plurality of system control units, wherein:

the computer system defines a plurality of nodes;

each node of the plurality of nodes including a system control unit of the plurality of system control units and one or more of the plurality of connected processors and caches;

wherein each system control unit is configured to store memory-module addresses of data copied from locked memory regions to connected processors and caches within the same node as the system control unit; and wherein each system control unit is configured to write back cache data to the locked memory region in response to an unlock request for the locked memory region issued by connected processors and caches within the same node as the system control unit.

16. The computer system of claim 15, and further comprising one or more additional memory modules to form a plurality of memory modules, each memory module of the plurality of memory modules being configured to store a copy of the data in the other memory modules, wherein the memory controller includes a voter configured to compare copies of data received from the plurality of memory modules and select data having the greatest occurrence from among the copies of data.

17. The computer system of claim 15, wherein for at least one node of the plurality of nodes:

the node further includes two or more of the plurality of connected processors and caches;

the node further includes a bus connecting the system control unit to the two or more connected processors and caches;

the system control unit receives lock and unlock requests from the two or more connected processors and caches via the common bus; and the system control unit includes a readable port accessible through the common bus and configured to provide information on the availability of the system control unit for receiving a lock request from the two or more connected processors and caches.

* * * * *